(12) United States Patent
Zhang et al.

(10) Patent No.: US 12,195,881 B2
(45) Date of Patent: Jan. 14, 2025

(54) IN-SITU HYDROPHOBICALLY MODIFIED ARAMID NANO AEROGEL FIBER AND USES THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Xuetong Zhang, Suzhou (CN); Yaqian Bao, Suzhou (CN); Zengwei Liu, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 0 days.

(21) Appl. No.: 18/378,677

(22) Filed: Oct. 11, 2023

(65) Prior Publication Data
US 2024/0200231 A1    Jun. 20, 2024

Related U.S. Application Data

(62) Division of application No. 18/011,536, filed as application No. PCT/CN2022/085067 on Apr. 2, 2022.

(30) Foreign Application Priority Data

Aug. 2, 2021    (CN) .......................... 202110880290.3

(51) Int. Cl.
| | |
|---|---|
| *D01D 5/00* | (2006.01) |
| *B29C 64/118* | (2017.01) |
| *B29C 64/30* | (2017.01) |
| *B33Y 10/00* | (2015.01) |
| *B33Y 40/20* | (2020.01) |
| *B33Y 80/00* | (2015.01) |
| *D01D 5/06* | (2006.01) |
| *D01F 6/60* | (2006.01) |
| *B29K 77/00* | (2006.01) |
| *B29K 105/00* | (2006.01) |
| *B29K 105/04* | (2006.01) |

(52) U.S. Cl.
CPC .............. *D01D 5/06* (2013.01); *B29C 64/118* (2017.08); *B29C 64/30* (2017.08); *B33Y 10/00* (2014.12); *B33Y 40/20* (2020.01); *B33Y 80/00* (2014.12); *D01F 6/605* (2013.01); *B29K 2077/10* (2013.01); *B29K 2105/0061* (2013.01); *B29K 2105/04* (2013.01); *B29K 2995/0013* (2013.01); *B29K 2995/0077* (2013.01); *B29K 2995/0093* (2013.01); *D10B 2331/021* (2013.01); *D10B 2401/063* (2013.01)

(58) Field of Classification Search
CPC ....... D01D 5/00; D01D 1/02; B01J 20/28023; D04H 1/43838; B82Y 40/00
See application file for complete search history.

(56) References Cited

FOREIGN PATENT DOCUMENTS

| | | |
|---|---|---|
| CN | 110468461 A | 11/2019 |
| EP | 3441135 A1 | 2/2019 |

OTHER PUBLICATIONS

Lui et al Nanofibrous Kevlar Aerogel Threads for Thermal Insulation in Harsh Environments, ACS Nano 2019, 13, 5703-5711, published on May 1, 2019.*

* cited by examiner

*Primary Examiner* — Gregory Listvoyb
(74) *Attorney, Agent, or Firm* — Bayramoglu Law Offices LLC (57) ABSTRACT

An in-situ hydrophobically modified aramid nano aerogel fiber as well as a preparation method and uses thereof are provided. The preparation method includes: providing an aramid nano spinning solution; preparing a hydrophobically modified aramid nano aerogel fiber by using a spinning technology, wherein the coagulating bath adopted by the spinning technology includes a first organic solvent and a halogenated reagent including a monochloroalkane, a monochloroalkane, a dibromoalkane, a dichloroalkane and a trichloroalkane; and then drying to obtain the in-situ hydrophobically modified aramid nano aerogel fiber. The in-situ hydrophobically modified aramid nano aerogel fiber has a unique three-dimensional porous network structure, low heat conductivity, high porosity, high tensile strength and elongation at break, a certain spinnability and structure stability, and can be applied to the field of textiles. A fabric knitted with the hydrophobic fibers has a self-cleaning ability.

14 Claims, 2 Drawing Sheets

IN-SITU HYDROPHOBICALLY MODIFIED ARAMID NANO AEROGEL FIBER AND USES THEREOF

CROSS REFERENCE TO THE RELATED APPLICATIONS

This application is a divisional application of U.S. patent application Ser. No. 18/011,536. U.S. patent application Ser. No. 18/011,536 is the national phase entry of International Application No. PCT/CN2022/085067, filed on Apr. 2, 2022, which is based upon and claims priority to Chinese Patent Application No. 202110880290.3, filed on Aug. 2, 2021, the entire contents of which are incorporated herein by reference.

TECHNICAL FIELD

The present application relates to a novel functional fiber and a modified preparation method thereof, particularly to an in-situ hydrophobically modified aramid nano aerogel fiber as well as a preparation method and use thereof, belonging to the technical field of nano porous materials and functional fibers.

BACKGROUND

With the development of science and technology, an aerogel material has been applied in many aspects and is a nano porous solid material formed by mutually accumulating colloidal particles or polymer molecules to form a network structure, and its dispersion medium is a gas. In general, the aerogel material has extremely low apparent density, large specific surface area, high porosity and low heat conductivity. Most importantly, the aerogel material has a rich mesoporous structure, and a mesopore having a pore size of 2-50 nm are ideal functionalized material carrier. However, it is due to the existence of the porous structure that aerogel has relatively poor mechanical performance and large brittleness. At present, the most common aerogel is massive. It is technically difficult to obtain a continuous fibrous aerogel (i.e., aerogel fiber).

It has been previously reported that an aramid nano gel fiber is of a three-dimensional network structure formed by accumulating aramid nano fibers. The aramid nano fiber is a one-dimensional organic nano material composed of nano-scale poly(p-phenylenedicarbonamide) (PPTA), and one of the most strongest polymer materials. They not only have characteristic nano structures, large draw ratios and large specific surface areas but also retain excellent mechanical property, chemical property and heat-resistant property derived from PPTA fibers, which makes them take an important effect of "building blocks" in the construction aspect of advanced composite materials, and have huge potential. The aramid nano aerogel fiber has relatively excellent mechanical property and meanwhile has high specific surface area and large porosity, and is an aerogel fiber which is nearest to practical application. However, due to lots of amido bonds in the aramid structure, the aerogel fiber is hydrophilic and has a contact angle of 67° in general, thus it must be used in a dry and anhydrous environment, or else the porous structure of the aerogel is extremely prone to absorbing water at room temperature at normal pressure to cause a framework to be shrunk and collapsed. Therefore, it is necessary for hydrophobic modification of aramid nano aerogel fibers.

At present, it has been reported that hydrophobic modification is performed on the surface of the fiber with fluorocarbon. However, fluorocarbon easily falls off in the process of use to cause unsustainable performance. Furthermore, use of fluorocarbon belongs to a posttreatment process, which results in complicated preparation. Hence, it is a challenge to realize the hydrophobic modification of porous materials in situ without damaging the bulk performance of the porous material.

SUMMARY

The main objective of the present application is to provide an in-situ hydrophobically modified aramid nano aerogel fiber in the process of spinning and a preparation method thereof to overcome the defects in the prior art.

Another objective of the present application is to provide uses of the in-situ hydrophobically modified aramid nano aerogel fiber.

In order to achieve the above objectives, the technical solution adopted by the present application comprises:

The embodiments of the present application provide a preparation method of an in-situ hydrophobically modified aramid nano aerogel fiber, comprising:
  providing an aramid nano spinning solution;
  preparing a hydrophobically modified aramid nano gel fiber by using a spinning technology, wherein the coagulating bath adopted by the spinning technology comprises a first organic solvent and a halogenated reagent which comprises a combination of any one or more than two of monochloroalkane, monochloroalkane, dibromoalkane, dichloroalkane and trichloroalkane; and
  drying the hydrophobically modified aramid nano gel fiber to obtain the in-situ hydrophobically modified aramid nano aerogel fiber.

In some embodiments, a volume ratio of the halogenated reagent to the first organic solvent is 20:1-1:20.

The embodiments of the present application further provide the in-situ hydrophobically modified aramid nano aerogel fiber prepared by the above-mentioned method, wherein the in-situ hydrophobically modified aramid nano aerogel fiber has a connected three-dimensional porous network structure which is formed by overlapping grafting modified aramid nano structures having a size of 8 nm-300 nm.

Further, the in-situ hydrophobically modified aramid nano aerogel fiber has a heat conductivity of 50 mW/(m·K).

Further, the in-situ hydrophobically modified aramid nano aerogel fiber has a tensile strength of 3-35 MPa and an elongation at break of 10-50%.

Further, a contact angle between the surface of the in-situ hydrophobically modified aramid nano aerogel fiber and water is from 90° to 150°, and the grafting substitution degree of the in-situ hydrophobically modified aramid nano aerogel fiber is 0.01-20%.

Correspondingly, the embodiments of the present application further provide use of the in-situ hydrophobically modified aramid nano aerogel fiber in the fields of oil-water separation, waterproof self-cleaning fabrics, composite materials, hydrophobic fiber flakes, filtration materials or thermal insulation materials and the like.

Compared with the prior art, the present application has the following advantages:
1) the hydrophobically modified aramid nano aerogel fiber provided by the present application has a unique three-dimensional porous network structure, low heat conductivity, high porosity, high tensile strength and high elongation at break, a certain spinnability and excellent framework structure stability and can meet practical applications such as textiles and other fields, and a fabric knitted with the hydrophobic fibers has a certain self-cleaning ability. The hydrophobically modified aramid nano aerogel fiber provided by the present application can be further used as a carrier of a functional material to obtain a multi-functional aerogel, and therefore has a huge application prospect;

2) the hydrophobically modified aramid nano aerogel fiber provided by the present application is simple in preparation process (modification can be in situ completed in one step in the process of spinning or printing without posttreatment steps) and mild in reaction conditions. In addition, the hydrophobic modification method provided by the present application can realize large-scale preparation of hydrophobic aramid nano aerogel fiber flocs which are not stick to common liquids, such as red wine, coffee, milk, fruit juice, tea and coke, and show good hydrophobic performance.

BRIEF DESCRIPTION OF THE DRAWINGS

For more clearly illustrating the embodiments of the present application or technical solution in the prior art, drawings used in the descriptions of embodiments or the prior art will be simply discussed below. Obviously, the drawings described below are only some embodiments of the present application, and other drawings can also be obtained by persons of ordinary skill in the art without creative efforts.

DETAILED DESCRIPTION OF THE EMBODIMENTS

In view of the defects in the prior art, the inventors of this case propose the technical solution of the present application through large-term research and lots of practices. The inventors of this case unexpectedly find in the experiment that a terephthalamide (PPTA) solution is dissolved and dispersed into an organic alkaline solvent so that many N-reactive sites are generated on a molecular chain, and these active sites provide possibility for graft modification reaction. On the one hand, halogenated hydrocarbon reagents can be prone to nucleophilic substitution reaction with N- under alkaline conditions, thereby providing the possibility of graft modification; on the other hand, when enough alkanes are grafted, the whole aramid nano fiber macroscopically has hydrophobic performance to a certain extent due to their own hydrophobic properties, in such the way, the in-situ hydrophobic modification of the aramid fiber can be realized by utilizing a chemical reaction process.

Next, the technical solutions, implementation process, principle and others will be further explained and illustrated.

A preparation method of an in-situ hydrophobically modified aramid nano aerogel fiber in the process of spinning provided according to one aspect of the embodiments of the present application comprises:

providing an aramid nano spinning solution;

preparing a hydrophobically modified aramid nano gel fiber by using a spinning technology, wherein the coagulating bath used in the spinning technology includes a combination of a first organic solvent and a halogenated reagent which comprises a combination of any one or more than two of monochloroalkane, monochloroalkane, dibromoalkane, dichloroalkane and trichloroalkane; and drying the hydrophobically modified aramid nano gel fiber to obtain the in-situ hydrophobically modified aramid nano aerogel fiber.

In some embodiments, the preparation method specifically comprises the following steps:

(1) providing an aramid nano spinning solution;

(2) selecting and adjusting chemical compositions and proportions of a spinning coagulating bath;

(3) in a specific coagulating bath, preparing the hydrophobically modified aramid nano gel fiber from the aramid nano spinning solution through a certain spinning process; and (4) specially drying the hydrophobically modified aramid nano gel fiber to obtain the hydrophobically modified aramid nano aerogel fiber.

Where, in more particular and typical embodiments, the preparation method comprises:

(1) selecting and dissolving a proper poly(p-phthaloyl p-phenylenediamine) (trade name is aramid nano) material to prepare spinning solutions with different concentrations, wherein, preferably, the used poly(p-phthaloyl p-phenylenediamine) material can be dissolved into a certain solvent;

(2) selecting proper coagulating bath compositions, and adjusting proper proportions;

(3) carrying out sol-gel transition on the spinning solution through the spinning technology in a specific coagulating bath to obtain the hydrophobically modified aramid nano gel fiber; and (4) replacing the aramid nano gel fiber for many times with a certain proportion of solvent to obtain an alcohol gel fiber or a hydrogel fiber; and then drying the above aramid nano gel fiber using a specific drying technology to obtain the hydrophobically modified aramid nano aerogel fiber.

Further, the compositions of the coagulating bath used in the spinning process comprise a first organic solvent and a halogenated reagent which are mixed in a certain proportion.

In some embodiments, a volume ratio of the halogenated reagent to the first organic solvent is 20:1-1:20.

Further, the halogenated reagent can comprise bromobutane and dibromobutane, but is not limited thereto.

Particularly, the halogenated reagent can comprise a combination of any one or more than two of monobromobutane, monobromoethane, monochloroethane, dibromobutane, dichlorobutane and trichlormethane, but is not limited thereto.

In some embodiments, the first organic solvent comprises a combination of any one or more than two of DMSO, methanol, ethanol, propanol, butanol, formic acid and acetic acid, but is not limited thereto.

In some embodiments, the compositions of the aramid nano spinning solution are a second organic solvent and a poly(p-phthaloyl p-phenylenediamine) polymer, and the composition of the organic solvent includes, but is not limited to, a combination of one or more than two of DMF, DMSO, NMP and methanol.

Further, the poly(p-phthaloyl p-phenylenediamine) polymer includes, but is not limited to, a combination of any one or more than two of aramid 1313, aramid 1414 (aramid nano) and a poly(p-phthaloyl-p-phenylenediamine) modified polymer, etc.

Further, the concentration of the poly(p-phthaloyl p-phenylenediamine) polymer in the aramid nano spinning solution is 1-30wt %.

Further, the aramid nano spinning solution also comprises an alkaline substance. The alkaline substance comprises a combination of any one or more than two of KOH, NaOH and KTB (potassium tertiary butanol). P-phenylenedicarbonamide is dissolved and dispersed into an organic alkaline solvent, many N-reaction sites can be generated in a molecular chain, and these active sites provide possibility for grafting modification. Furthermore, halogenated hydrocarbon reagents can be prone to nucleophilic substitution with N- under the alkaline condition so as to provide the possibility of grafting modification.

As one of preferred solutions, the preparation method of the hydrophobically modified aramid nano gel fiber includes, but is not limited to, a combination of any one or two of a wet spinning technology and a 3D printing technology, more preferably a wet spinning process.

As one of preferred solutions, the wet spinning technology comprises: the aramid nano spinning solution is a polymer solution with a selected concentration, the spinning solution is extruded into the coagulating bath through an injection pump, and the compositions and proportions of the coagulating bath used by spinning are adjusted, so that the poly(p-phthaloyl-p-phenylenediamine) polymer in the aramid nano spinning solution is physically crosslinked or chemically crosslinked to form the hydrophobically modified aramid nano gel fiber.

Further, the process conditions used for the wet spinning technology are as follows: the aramid nano spinning solution with the selected concentration is provided, wherein the concentration of the aramid nano spinning solution is 1-30wt %; the spinning solution is extruded into the coagulating bath by the injection pump, wherein the diameter of the extrusion needle is 10 μm-2 μm.

Further, the 3D printing technology comprises: the fiber printed by using the aramid nano spinning solution as printing ink in an environment where the mixed solution of the second organic solvent and the halogenated reagent as the coagulating bath is physically crosslinked or chemically crosslinked to form the hydrophobically modified aramid nano gel fiber.

As one of preferred solutions, the preparation method comprises: firstly, a solvent that is not easy to dry in the hydrophobically modified aramid nano gel fiber is replaced with a solvent that is easy to dry for many times, and then the hydrophobically modified aramid nano gel fiber after replacement is dried.

Further, the solvent that is easy to dry comprises a combination of any one or more than two of water, methanol, ethanol, tertiary butanol, acetone, cyclohexane and n-hexane, but is not limited to thereto.

As one of preferred solutions, the drying comprises a combination of any one or more than two of a supercritical fluid drying method, a vacuum freeze drying method and an ambient drying method, preferably the supercritical fluid drying method, but is not limited thereto.

Further, the supercritical fluid drying method comprises: replacing liquid components inside the hydrophobically modified aramid nano gel fiber by using supercritical fluid in a supercritical environment of a specific fluid to obtain the hydrophobically modified aramid nano aerogel fiber, wherein the used supercritical fluid includes, but is not limited to, any one of supercritical $CO_2$, supercritical methanol, supercritical ethanol and supercritical acetone.

Further, the vacuum freeze drying technology is also called sublimation drying, which comprises: the hydrophobically modified aramid nano gel fiber is frozen below the freezing point, and then the solvent is sublimated and removed in high vacuum to obtain the hydrophobically modified aramid nano aerogel fiber material.

Still further, the freezing method comprises: freezing in a freezing device in advance and freezing directly in a drying room through rapid vacuumizing. The cold trap temperature of the vacuum freeze drying is conducted at a trap temperature of −80° C. to −45° C. in a vacuum degree of less than 0.1 kPa. The vacuum freeze drying method is especially preferred.

Further, the ambient drying technology comprises: placing the hydrophobically modified aramid nano gel fiber material under normal pressure or low vacuum, and then raising the temperature to evaporate the solvent, so as to obtain the hydrophobically modified aramid nano aerogel fiber material.

To sum up, the hydrophobically modified aramid nano aerogel fiber provided in the present application is simple in preparation process (modification can be completed in situ in the process of spinning or printing without posttreatment steps) and mild in reaction conditions, and can be used for large-scale production, including but not limited to large-scale production of hydrophobic aerogel fiber flocs using this modification method, Another aspect of the embodiments of the present application provides the in-situ hydrophobically modified aramid nano aerogel fiber prepared by the above method. The in-situ hydrophobically modified aramid nano aerogel fiber has a connected three-dimensional porous network structure which is formed by overlapping the grafting modified aramid nano structures having a size of 8 nm-300 nm.

Further, the material of the in-situ hydrophobically modified aramid nano aerogel fiber comprises an aramid nano (poly(p-phthaloyl-p-phenylenediamine) fiber, specifically comprising a combination of any one or more than two of aramid 1313, aramid 1414 and a poly(p-phthaloyl-p-phenylenediamine) modified polymer.

Further, the three-dimensional porous network structure is composed of micropores of less than 2 nm, mesopores of 2-50 nm and macropores of 50 nm-500 μm.

Further, the three-dimensional porous network structure has a porosity of 60%-99%, preferably 70%-90%, and a specific surface area of 100-1000 $m^2/g$.

Further, the in-situ hydrophobically modified aramid nano aerogel fiber has a diameter of 10 μm-2 mm, preferably 50 μm-1 mm, more preferably 50 μm-500 μm, and a draw ratio of more than 10.

Further, the in-situ hydrophobically modified aramid nano aerogel fiber has a relatively low heat conductivity (the heat conductivity is less than 50 mW/(m·K), excellent mechanical property and a certain spinnability.

Further, the in-situ hydrophobically modified aramid nano aerogel fiber has a tensile strength of 3-35 MPa and an elongation at break of 10-50%.

Further, the contact angle between the surface of the in-situ hydrophobically modified aramid nano aerogel fiber and water can be adjusted from 90° to 150°, and the fabric knitted with the hydrophobic fibers has a certain self-cleaning ability, and the grafting substitution degree of the in-situ hydrophobically modified aramid nano aerogel fiber is 0.01-20%.

Still further, according to the present disclosure, the hydrophobically modified aramid nano aerogel fibers prepared by carrying out sol-gel transition in different coagulating bath compositions and then drying have different hydrophobic angles. By taking bromobutane as an example, the hydrophobic angle can be adjusted from 90° to 150°.

Further, the in-situ hydrophobically modified aramid nano aerogel fiber can be used as a carrier of a functional material to further obtain a multifunctional aerogel fiber, and therefore has a huge application prospect.

Further, the in-situ hydrophobically modified aramid nano aerogel fiber can be applied to the fields of oil-water separation, waterproof and self-cleaning fabrics, composites, hydrophobic fiber flocs, filtration materials, thermal insulation materials and the like.

Further, the in-situ hydrophobically modified aramid nano aerogel fiber can be used for large-scale preparation of hydrophobic aerogel fibers and flocs thereof. The flocs are not stick to common liquids, such as red wine, coffee, milk, fruit juice, tea and coke, and show good hydrophobic performance.

As one of preferred solutions, the in-situ hydrophobically modified aramid nano aerogel fiber includes the following uses:
1) the in-situ hydrophobically modified aramid nano aerogel gel fiber shows good mechanical strength, excellent flexibility and a certain spinnability because it uses an aramid nano material as a skeleton; moreover, the fabricated hydrophobic fabric can not only meet practical application places, but also has a self-cleaning ability, and therefore can be widely applied to the field of textiles;
2) the three-dimensional network structure of the in-situ hydrophobically modified aramid nano aerogel fiber gives it great porosity and extremely high air content, and the fiber flocs fabricated by this method have low heat conductivity and can be used as a thermal insulation material;
3) the opening structure of the in-situ hydrophobically modified aramid nano aerogel fiber can be applied to one or more application fields, such as oil-water separation, waterproof and self-cleaning fabrics, composites, hydrophobic fiber flocs, filtration materials, thermal insulation materials, but is not limited to thereto.

By virtue of the above technical solutions, the in-situ hydrophobically modified aramid nano aerogel fiber provided by the present application has an opening three-dimensional network structure and a stable skeleton structure, and has great application prospects in the fields of oil-water separation, waterproof and self-cleaning fabrics, composites, hydrophobic fiber flocs, filtration materials, heat insulation materials and the like.

The technical solutions of the present application are further described in detail below in combination with several preferred embodiments and the accompanying drawings. Obviously, the described embodiments are only part of the embodiments of the application, not all of them. Based on the embodiments in the present application, all other embodiments obtained by persons of ordinary skill in the art without creative efforts fall within the protective scope of the present application. The experimental method without specific conditions in the following examples is usually based on conventional conditions or the conditions recommended by the manufacturer.

Example 1

(1) A poly(p-phthaloyl-p-phenylenediamine) fiber and an equivalent amount of KOH were dissolved into DMSO to form a 1% spinning solution;
(2) the spinning solution was extruded into a coagulating bath where monobromobutane: ethanol (volume ratio) =1:3 through an injection pump to react to form hydrophobically modified aramid nano gel fibers, wherein the diameter of an extrusion needle was 250 μm;
(3) a solvent in the above hydrophobically modified aramid nano gel fiber was replaced with ethanol for many times; and
(4) after replacement, the alcohol gel fibers were dried in a supercritical $CO_2$ drier until no solvent was present in the fiber.

Figure 1:
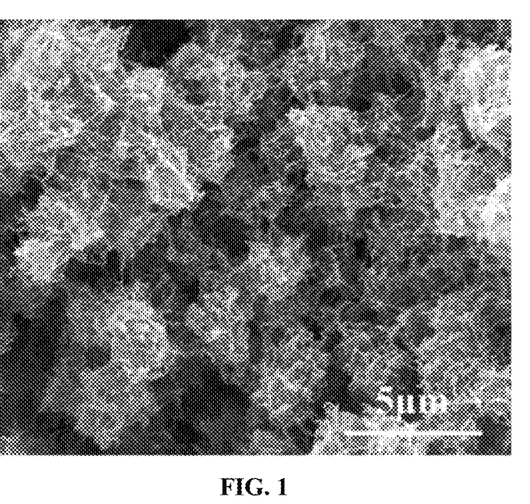
FIG. 1 is a scanning electronic microscope (SEM) image of an in-situ hydrophobically modified aramid nano aerogel fiber obtained in example 1 of the present application.
Figure 2:
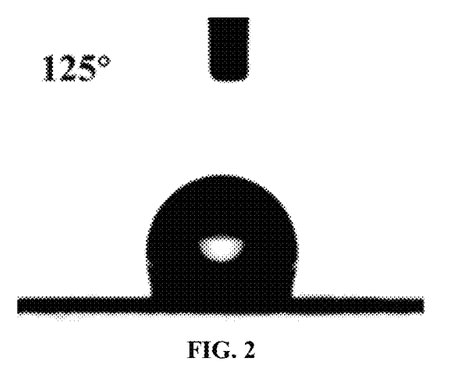
FIG. 2 is a picture of a contact angle of an in-situ hydrophobically modified aramid nano aerogel fiber obtained in example 1 of the present application.

FIG. 1 is an SEM image of a hydrophobically modified aramid nano gel fiber obtained in this example, and FIG. 2 shows a contact angle of a hydrophobically modified aramid nano aerogel fiber obtained in this example. Other parameters of the hydrophobically modified aramid nano aerogel fiber obtained in this example are seen in Table 1.

Example 2

(1) A poly(p-phthaloyl-p-phenylenediamine) fiber and an equivalent amount of KOH were dissolved into DMSO to form a 2% spinning solution;
(2) the spinning solution was extruded into a coagulating bath where dibromobutane: ethanol (volume ratio)=2:1 through an injection pump to react to form a hydrophobically modified aramid nano gel fiber, wherein the diameter of an extrusion needle was 250 μm;
(3) a solvent in the above hydrophobically modified aramid nano gel fiber was replaced with ethanol for many times; and
(4) after replacement, the alcohol gel fiber was dried in a supercritical $CO_2$ drier until no solvent was present in the fiber.

Figure 3:
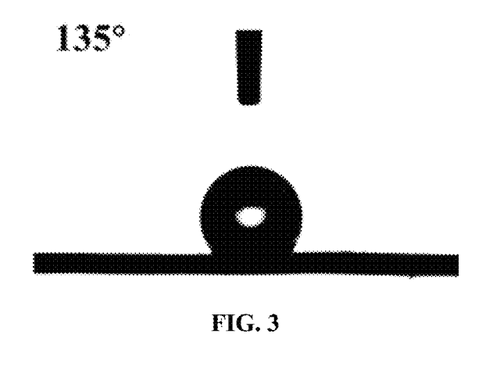
FIG. 3 is a picture of a contact angle of an in-situ hydrophobically modified aramid nano aerogel fiber obtained in example 2 of the present application.

FIG. 3 shows a contact angle of a hydrophobically modified aramid nano aerogel fiber obtained in this example. Other parameters of the hydrophobically modified aramid nano aerogel fiber obtained in this example are seen in Table 1.

Example 3

(1) A poly(p-phthaloyl-p-phenylenediamine) fiber and an equivalent amount of KOH were dissolved into DMSO to form a 2% spinning solution;
(2) the spinning solution was extruded into a coagulating bath where dibromobutane: ethanol (volume ratio)=3:1 through an injection pump to react to form a hydrophobically modified aramid nano gel fiber, wherein the diameter of an extrusion needle was 250 μm;
(3) a solvent in the above hydrophobically modified aramid nano gel fiber was replaced with acetone for many times; and
(4) after replacement, the alcohol gel fiber was dried in a supercritical $CO_2$ drier until no solvent was present in the fiber.

Figure 4:
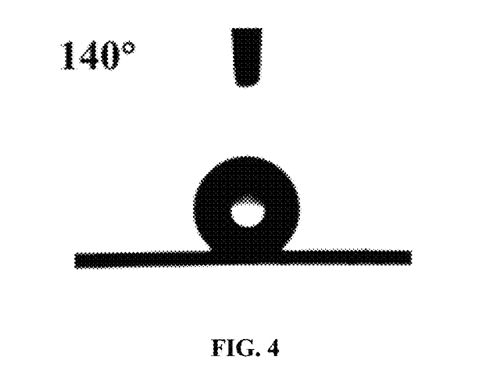
FIG. 4 is a picture of a contact angle of an in-situ hydrophobically modified aramid nano aerogel fiber obtained in example 3 of the present application.

FIG. 4 shows a contact angle of a hydrophobically modified aramid nano aerogel fiber obtained in this example. Other parameters of the hydrophobically modified aramid nano aerogel fiber obtained in this example are seen in Table 1.

Example 4

(1) A poly(p-phthaloyl-p-phenylenediamine) fiber and an equivalent amount of KOH were dissolved into NMP to form a 3% spinning solution;
(2) the spinning solution was extruded into a coagulating bath where monobromobutane: ethanol (volume ratio) =2:1 through an injection pump to react to form a hydrophobically modified aramid nano gel fiber, wherein the diameter of an extrusion needle was 250 μm;
(3) a solvent in the above hydrophobically modified aramid nano gel fiber was replaced with deionized water for many times; and
(4) after replacement, the hydrogel fiber was frozen for 8 h at −12° C. and then dried in a vacuum freeze drier until no solvent was present in the fiber. The parameters of the hydrophobically modified aramid nano aerogel fiber obtained in this example are seen in Table 1.

Example 5

Figure 5:
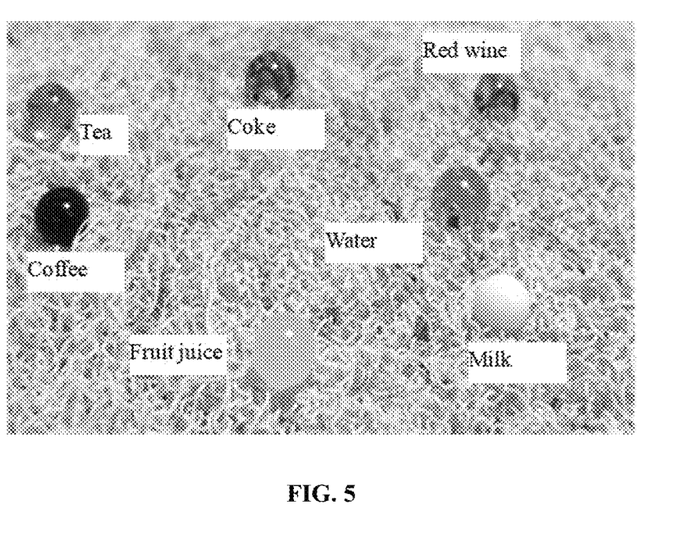
FIG. 5 is a picture of an in-situ hydrophobically modified aramid nano aerogel fiber that is not stick to common liquids and obtained in example 5 of the present application.

(1) A poly(p-phthaloyl-p-phenylenediamine) fiber and an equivalent amount of KTB were dissolved into DMF to form a 1% spinning solution;
(2) the spinning solution was extruded into a coagulating bath where dichlorobutane: ethanol (volume ratio)=2:1 through an injection pump to react to form a hydrophobically modified aramid nano gel fiber floc, wherein the diameter of an extrusion needle was 250 μm;
(3) a solvent in the above hydrophobically modified aramid nano gel fiber floc was replaced for many times with ethanol; and
(4) after replacement, the alcohol gel fiber floc was dried into a supercritical $CO_2$ drier until no solvent was present in the fiber. FIG. 5 is a picture of an in-situ hydrophobically modified aramid nano aerogel fiber floc that is not stick to common liquids and obtained in this example.

Example 6

(1) A poly(p-phthaloyl-p-phenylenediamine) fiber and an equivalent amount of KOH were dissolved into DMSO to form a 2% spinning solution;
(2) the spinning solution was extruded into a coagulating bath where monobromobutane: ethanol (volume ratio) =1:1 through an injection pump to react to form hydrophobically modified aramid nano gel fiber, wherein the diameter of an extrusion needle was 250 μm;
(3) a solvent in the above hydrophobically modified aramid nano gel fiber was replaced with tertiary butanol for many times; and
(4) the hydrogel fiber was frozen for 8 h at −12° C. and then dried in a vacuum freeze drier at the cold trap temperature of −50° C. until no solvent was present in the fibers. The parameters of the hydrophobically modified aramid nano aerogel fiber obtained in this example are seen in Table 1.

Example 7

(1) A poly(p-phthaloyl-p-phenylenediamine) fiber and an equivalent amount of KOH were dissolved into DMSO to form a 8% spinning solution;
(2) the spinning solution was extruded into a coagulating bath where monobromoethane: methanol (volume ratio)=2:1 through an injection pump to react to form a hydrophobically modified aramid nano gel fiber, wherein the diameter of an extrusion needle was 300 μm;
(3) a solvent in the above hydrophobically modified aramid nano gel fibers was replaced with ethanol for many times; and
(4) after replacement, the hydrogel fiber was dried in a supercritical $CO_2$ drier until no solvent was present in the fiber. The parameters of the hydrophobically modified aramid nano aerogel fiber obtained in this example are seen in Table 1.

Example 8

(1) A poly(p-phthaloyl-p-phenylenediamine) fiber and an equivalent amount of KOH were dissolved into NMP to form a 10% spinning solution;
(2) the spinning solution was extruded into a coagulating bath where dichlorobutane: ethanol (volume ratio)=1:1 through an injection pump to react to form a hydrophobically modified aramid nano gel fiber, wherein the diameter of an extrusion needle was 500 μm;
(3) a solvent in the above hydrophobically modified aramid nano gel fiber was replaced with ethanol for many times; and
(4) after replacement the hydrogel fiber was dried in a supercritical ethanol drier until no solvent was present in the fiber. The parameters of the hydrophobically modified aramid nano aerogel fiber obtained in this example are seen in Table 1.

Example 9

(1) an aramid 1313 fiber and an equivalent amount of KOH were dissolved into DMSO to form a 5% spinning solution;
(2) the spinning solution was extruded into a coagulating bath where dichlorobutane: ethanol (volume ratio) =20:1 through an injection pump to react to form a hydrophobically modified aramid nano gel fiber, wherein the diameter of an extrusion needle was 10 μm;
(3) a solvent in the above hydrophobically modified aramid nano gel fiber was replaced with ethanol for many times; and
(4) after replacement, the alcohol gel fiber was dried in a supercritical $CO_2$ drier until no solvent was present in the fiber. The parameters of the hydrophobically modified aramid nano aerogel fiber obtained in this example are seen in Table 1.

Example 10

(1) An aramid 1414 fiber and an equivalent amount of NaOH were dissolved into DMSO to form a 2% spinning solution;
(2) the spinning solution was extruded into a coagulating bath where monobromobutane:dibromobutane:ethanol (volume ratio)=2:2:1 through an injection pump to react to form a hydrophobically modified aramid nano gel fiber, wherein the diameter of an extrusion needle was 2 mm;

(3) a solvent in the above hydrophobically modified aramid nano gel fiber was replaced with cyclohexane for many times; and (4) after replacement, the alcohol gel fiber was dried in a supercritical $CO_2$ drier until no solvent was present in the fiber. The parameters of the hydrophobically modified aramid nano aerogel fiber obtained in this example are seen in Table 1.

Example 11

(1) A poly(p-phthaloyl-p-phenylenediamine) fiber and an equivalent amount of KOH were dissolved into DMSO to form a 8% spinning solution;

(2) the spinning solution was extruded into a coagulating bath where monobromobutane: methanol (volume ratio)=2:2 through an injection pump to react to form a hydrophobically modified aramid nano gel fiber, wherein the diameter of an extrusion needle was 250 μm;

(3) a solvent in the above hydrophobically modified aramid nano gel fiber was replaced with a tertiary butanol aqueous solution for many times; and (4) after replacement, the gel fiber was dried into a vacuum freeze drier at the cold trap temperature of −45° C. until no solvent was present in the fiber. The parameters of the hydrophobically modified aramid nano aerogel fiber obtained in this example are seen in Table 1.

Example 12

(1) A Poly(p-phthaloyl-p-phenylenediamine) fiber and an equivalent amount of KTB were dissolved into DMSO to form a 30% spinning solution;

(2) the spinning solution was extruded into a coagulating bath where dichlorobutane: propanol (volume ratio) =2:1 through an injection pump to react to form a hydrophobically modified aramid nano gel fiber, wherein the diameter of an extrusion needle was 2 mm;

(3) a solvent in the above hydrophobically modified aramid nano gel fiber was replaced with tertiary butanol for many times; and (4) after replacement, the gel fiber was dried in a vacuum freeze drier at the cold trap temperature of −80° C. until no solvent was present in the fiber. The parameters of the hydrophobically modified aramid nano aerogel fiber obtained in this example are seen in Table 1.

Example 13

(1) A poly(p-phthaloyl-p-phenylenediamine) fiber and an equivalent amount of KOH were dissolved into DMF to form a 2% spinning solution;

(2) the spinning solution was extruded into a coagulating bath where dibromobutane: butanol (volume ratio)=1: 20 through an injection pump to react to form a hydrophobically modified aramid nano gel fiber, wherein the diameter of an extrusion needle was 250 μm;

(3) a solvent in the above hydrophobically modified aramid nano gel fiber was replaced with methanol for many times; and (4) after replacement, the alcohol gel fiber was dried in a supercritical $CO_2$ drier until no solvent was present in the fiber. The parameters of the hydrophobically modified aramid nano aerogel fiber obtained in this example are seen in Table 1.

Example 14

(1) A poly(p-phthaloyl-p-phenylenediamine) fiber and an equivalent amount of KTB were dissolved into DMSO and methanol to form a 15% spinning solution;

(2) the spinning solution was extruded into a coagulating bath where dibromobutane: formic acid (volume ratio) =1:1 through an injection pump to react to form a hydrophobically modified aramid nano gel fiber, wherein the diameter of an extrusion needle was 100 μm;

(3) a solvent in the above hydrophobically modified aramid nano gel fiber was replaced with acetone for many times; and (4) after replacement, the alcohol gel fiber was dried in a supercritical $CO_2$ drier until no solvent was present in the fiber. The parameters of the hydrophobically modified aramid nano aerogel fiber obtained in this example are seen in Table 1.

Example 15

(1) A poly(p-phthaloyl-p-phenylenediamine) fiber and an equivalent amount of KTB were dissolved into DMF and methanol to form a 10% spinning solution;

(2) the spinning solution was extruded into a coagulating bath where trichloromethane: formic acid (volume ratio)=1:3 through an injection pump to react to form a hydrophobically modified aramid nano gel fiber, wherein the diameter of an extrusion needle was 500 μm;

(3) a solvent in the above hydrophobically modified aramid nano gel fiber was replaced with n-hexane for many times; and (4) after replacement, the alcohol gel fiber was dried in an oven at 60° C. under normal pressure until no solvent was present in the fiber. The parameters of the hydrophobically modified aramid nano aerogel fiber obtained in this example are seen in Table 1.

TABLE 1

Structures and performance parameters of hydrophobically modified aramid nano aerogel fibers obtained in examples 1-15

| Example | Diameter (μm) | Pore volume ($cm^3/g$) | Tensile strength (MPa) | Elongation at break % | Contact angle (°) |
|---|---|---|---|---|---|
| 1 | 220 | 0.27 | 5 | 24 | 125 |
| 2 | 210 | 0.32 | 7 | 26 | 135 |
| 3 | 230 | 0.34 | 6 | 27 | 140 |
| 4 | 200 | 0.35 | 8 | 30 | 121 |
| 5 | 230 | 0.26 | 3 | 19 | 128 |
| 6 | 225 | 0.49 | 5 | 23 | 120 |
| 7 | 250 | 0.31 | 15 | 29 | 129 |
| 8 | 460 | 0.38 | 26 | 35 | 121 |
| 9 | 10 | 0.39 | 3 | 12 | 150 |
| 10 | 2000 | 0.48 | 5 | 20 | 110 |
| 11 | 210 | 0.30 | 6 | 23 | 123 |
| 12 | 1900 | 0.30 | 35 | 18 | 111 |
| 13 | 215 | 0.35 | 5 | 20 | 92 |
| 14 | 80 | 0.32 | 4 | 15 | 129 |
| 15 | 400 | 0.44 | 31 | 38 | 118 |

Comparative Example 1

(1) A poly(p-phthaloyl-p-phenylenediamine) fiber and an equivalent amount of KOH were dissolved into DMSO to form a 1% spinning solution;
(2) the spinning solution was extruded into an ethanol coagulating bath to react to form an aramid nano gel fiber, wherein the diameter of an extrusion needle was 250 μm;
(3) a solvent in the above aramid nano gel fiber was replaced with ethanol for many times; and
(4) after replacement, the alcohol gel fiber was dried in a supercritical $CO_2$ drier until no solvent was present in the fibers. The dried fiber has a pore volume of 0.28 $cm^3/g$, a tensile strength of 6 MPa, an elongation at break of 23% and a water contact angle of 67°.

Compared with the above examples, this comparative example without hydrophobic modification has the characteristic of hydrophilicity and a contact angle of 67°; and the contact angle of the fiber obtained in example 1 after modification is significantly improved. It can be seen from Table 1 that the contact angle is 125°, thus the fiber obtained in example 1 has a good hydrophobic effect.

By examples 1-15, it can be found that the in-situ hydrophobically modified aramid nano aerogel fiber obtained by the above technical solution of the present application has continuous and stable three-dimensional porous network structures, high porosity, good tensile strength, good elongation at break and excellent framework structure stability; furthermore, the in-situ hydrophobically modified aramid nano aerogel fiber is simple in preparation process (modification can be completed in situ in the process of spinning without posttreatment steps) mild in reaction conditions, and can be used for large-scale production; finally, the hydrophobic aerogel fiber can serve as the carrier of the functional material so as to further obtain the multifunctional aerogel fiber, and therefore has a huge application prospect.

In addition, the inventors of this case conducted experiments with other raw materials and conditions listed in this specification by referring to example 1-example 15, and similarly prepare the hydrophobically modified aramid nano aerogel fiber with unique continuous three-dimensional network structure and excellent framework structure stability.

It should be understood that the above descriptions are only some embodiments of the present application. It should be noted that other deformations and improvements can be made by persons of ordinary skill in the art without departing from creative concept of the present application, which all belong to the protective scope of the present application.

What is claimed is:

1. An in-situ hydrophobically modified aramid nano aerogel, wherein the in-situ hydrophobically modified aramid nano aerogel fiber has a connected three-dimensional porous network structure formed by overlapping grafting modified aramid nano structures having a size of 8 nm-300 nm; the connected three-dimensional porous network structure is composed of micropores having a size of less than 2 nm, mesopores having a size of 2-50 nm and macropores having a size of 50 nm-500 μm; the connected three-dimensional porous network structure has a porosity of 60%-99% and a specific surface area of 100-1000 $m^2/g$; the in-situ hydrophobically modified aramid nano aerogel fiber has a diameter of 10 μm-2 mm and a draw ratio of more than 10; the in-situ hydrophobically modified aramid nano aerogel fiber has a heat conductivity of 50 mW/(m·K), a tensile strength of 3-35 Mpa, and an elongation at break of 10-50%; the in-situ hydrophobically modified aramid nano aerogel fiber is prepared by a preparation method comprising:
providing an aramid nano spinning solution;
preparing a hydrophobically modified aramid nano gel fiber by using a spinning technology, wherein a coagulating bath adopted by the spinning technology comprises a first organic solvent and a halogenated reagent comprising a combination of any one or more than two of monochloroalkane, dibromoalkane, dichloroalkane, and trichloroalkane; and
drying the hydrophobically modified aramid nano gel fiber to obtain the in-situ hydrophobically modified aramid nano aerogel fiber.

2. A method of using the in-situ hydrophobically modified aramid nano aerogel fiber according to claim 1, comprising using the in-situ hydrophobically modified aramid nano aerogel fiber in fields of oil-water separation, waterproof self-cleaning fabrics, composite materials, hydrophobic fiber flocs, filtration materials, or thermal insulation materials.

3. The in-situ hydrophobically modified aramid nano aerogel fiber according to claim 1, wherein in a preparation process, a volume ratio of the halogenated reagent to the first organic solvent is 20:1-1:20; and/or, the first organic solvent comprises a combination of any one or more than two of DMSO, methanol, ethanol, propanol, butanol, formic acid, and acetic acid; and/or, the halogenated reagent comprises a combination of one or more than two of monobromobutane, monobromoethane, monochloroethane, dibromobutane, dichlorobutane, and trichloromethane.

4. The in-situ hydrophobically modified aramid nano aerogel fiber according to claim 1, wherein in a preparation process, the aramid nano spinning solution comprises a second organic solvent and a poly(p-phthaloyl p-phenylenediamine) polymer; the second organic solvent comprises a combination of any one or more than two of DMF, DMSO, NMP, and methanol; the poly(p-phthaloyl p-phenylenediamine) polymer comprises a combination of any one or more than two of aramid 1313, aramid 1414, and a poly(p-phthaloyl-p-phenylenediamine) modified polymer; a concentration of the poly(p-phthaloyl p-phenylenediamine) polymer in the aramid nano spinning solution is 1-30 wt %;
the aramid nano spinning solution also comprises an alkaline substance; the alkaline substrate comprises a combination of any one or more than two of KOH, NaOH, and potassium tert-butoxide.

5. The in-situ hydrophobically modified aramid nano aerogel fiber according to claim 1, wherein in a preparation process, the spinning technology comprises a combination of any one or more than two of a wet spinning technology and a 3D printing technology.

6. The in-situ hydrophobically modified aramid nano aerogel fiber according to claim 5, wherein in the preparation process, the wet spinning technology comprises: providing the aramid nano spinning solution with a selected concentration, and controlling compositions of the coagulating bath, so that poly(p-phthaloyl p-phenylenediamine) polymer in the aramid nano spinning solution is cross-linked to form the hydrophobically modified aramid nano gel fiber;
process conditions adopted by the wet spinning technology comprise: the concentration of the aramid nano spinning solution is 1-30wt %, the aramid nano spinning solution is extruded into the coagulating bath through an injection pump, and a diameter of an extrusion needle is 10 μm-2 mm.

7. The in-situ hydrophobically modified aramid nano aerogel fiber according to claim 5, wherein in the preparation process, the 3D printing technology comprises: carrying out a physical crosslinking or a chemical crosslinking on a fiber printed by using the aramid nano spinning solution as a printing ink in an environment where a mixed solution of a second organic solvent and the halogenated reagent is used as the coagulating bath to form the hydrophobically modified aramid nano gel fiber.

8. The in-situ hydrophobically modified aramid nano aerogel fiber according to claim 1, wherein the preparation method comprises: a solvent not easy to dry in the hydrophobically modified aramid nano gel fiber is replaced with a solvent easy to dry, and then the hydrophobically modified aramid nano gel fiber subjected to replacement is dried, the solvent easy to dry comprises a combination of any one or more than two of water, methanol, ethanol, tertiary butanol, acetone, cyclohexane, and n-hexane;

and/or, the drying comprises a combination of any one or more than two of a supercritical fluid drying method, a vacuum freeze drying method, and an ambient drying method.

9. The method according to claim 2, wherein a contact angle between a surface of the in-situ hydrophobically modified aramid nano aerogel fiber and water is from 90° to 150°, and a grafting substitution degree of the in-situ hydrophobically modified aramid nano aerogel fiber is 0.01-20%.

10. The in-situ hydrophobically modified aramid nano aerogel fiber according to claim 1, wherein the porosity of the connected three-dimensional porous network structure is 70%-99%.

11. The in-situ hydrophobically modified aramid nano aerogel fiber according to claim 1, wherein the diameter of the in-situ hydrophobically modified aramid nano aerogel fiber is 50 μm-1 mm.

12. The in-situ hydrophobically modified aramid nano aerogel fiber according to claim 1, wherein the diameter of the in-situ hydrophobically modified aramid nano aerogel fiber is 50 μm-500 μm.

13. The in-situ hydrophobically modified aramid nano aerogel fiber according to claim 5, wherein the spinning technology is the wet spinning technology.

14. The in-situ hydrophobically modified aramid nano aerogel fiber according to claim 7, wherein a contact angle between a surface of the in-situ hydrophobically modified aramid nano aerogel fiber and water is from 90° to 150°, and a grafting substitution degree of the in-situ hydrophobically modified aramid nano aerogel fiber is 0.01-20%.

* * * * *